Oct. 25, 1932.  E. S. HENNINGSEN  1,883,912
DYNAMO ELECTRIC MACHINE
Original Filed May 28, 1930
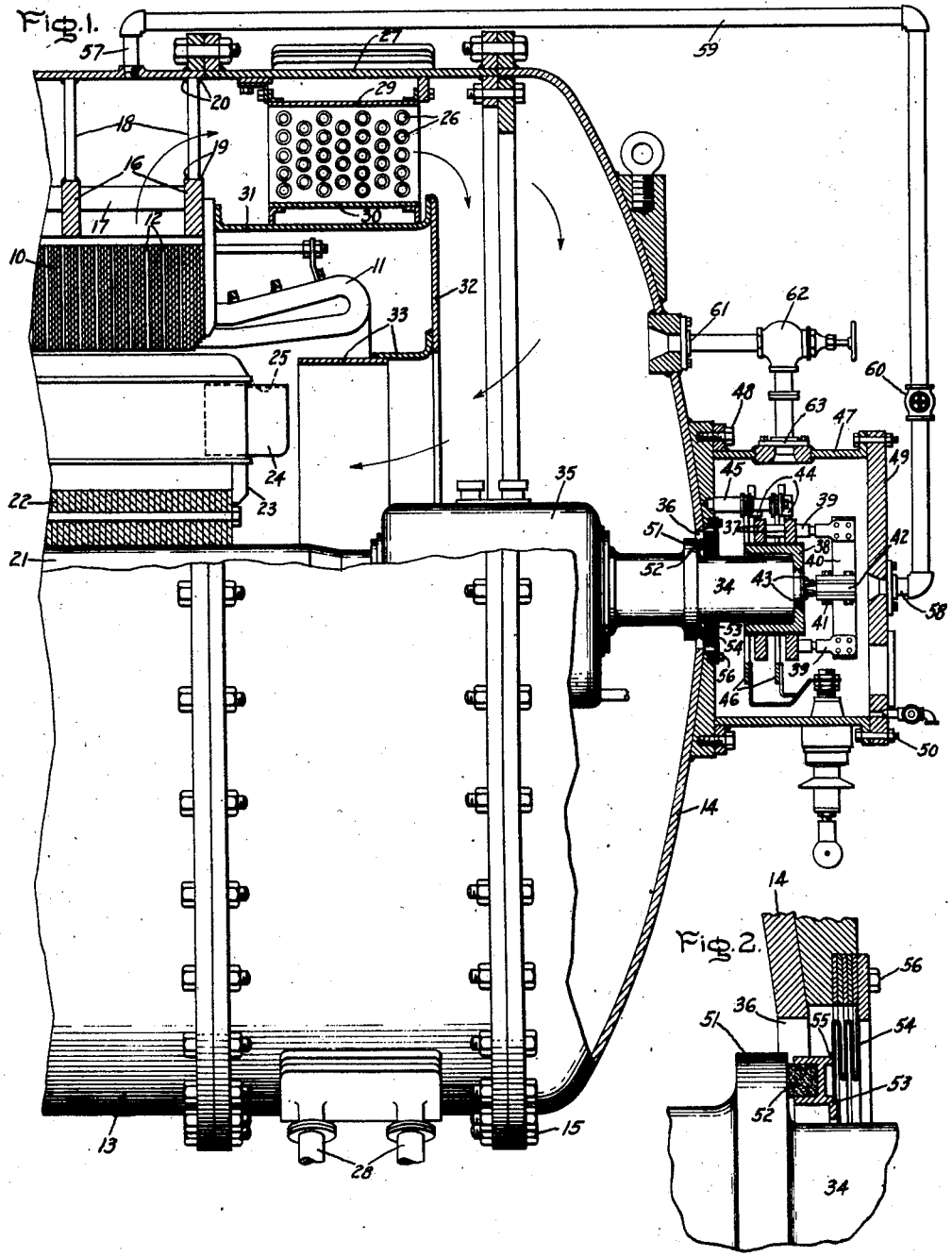
Inventor:
Earle S. Henningsen,
by Charles E. Tullar
His Attorney.

Patented Oct. 25, 1932

1,883,912

UNITED STATES PATENT OFFICE

EARLE S. HENNINGSEN, OF SCOTIA, NEW YORK, ASSIGNOR TO GENERAL ELECTRIC COMPANY, A CORPORATION OF NEW YORK

DYNAMO-ELECTRIC MACHINE

Application filed May 28, 1930, Serial No. 456,608. Renewed February 13, 1931.

My invention relates to dynamo-electric machines of the enclosed type.

In dynamo-electric machines of the enclosed type, for example, hydrogen cooled machines, as heretofore constructed, it has been difficult to provide convenient access to auxiliary devices enclosed in the machine such, for example, as the current-collecting devices associated with the machine. This has been due to the fact that when the devices were arranged within the main casings of the machines it was necessary to remove all of the gas from the machine and also remove the cumbersome enclosing end-heads in order to adjust or replace the devices. It has not been convenient to arrange devices associated with the shaft of the machines outside of the housings of these machines because the complicated sealing devices required to prevent excessive leakage of the cooling gas from the housing along the shaft.

The object of my invention is to provide an arrangement of the auxiliary devices such that they will be readily accessible without removing the cooling gas from the housing of the machine. I accomplish this by providing a dynamo-electric machine having a gas-filled housing enclosing the stationary and rotatable members thereof, devices associated with the machine, and a gas-tight casing enclosing the devices which communicates with the housing, and which can be closed off from the housing so as to permit the casing being opened and to provide access to the devices without removing the gas from the housing.

My invention will be more fully set forth in the following description referring to the accompanying drawing, and the features of novelty which characterize my invention will be pointed out with particularity in the claims annexed to and forming a part of this specification.

In the drawing Fig. 1 is a side elevation of a totally enclosed hydrogen-cooled dynamo-electric machine embodying my invention, partly broken away to more clearly illustrate the construction, and Fig. 2 is an enlarged fragmentary sectional view of the device which I employ for sealing the opening between the shaft of the rotatable member of the machine and the end-wall of the housing.

Referring to the drawing, I have shown my invention in connection with a totally enclosed hydrogen-cooled dynamo-electric machine. The stationary member of this machine includes a slotted laminated core structure 10 having windings 11 and radially extending ducts 12. The machine is enclosed by a cylindrical housing 13 having an end-head 14 which is bolted thereto at 15. This core structure is supported in the housing 13 by rings 16 which are reinforced by bars 17 and attached to the housing 13 by radially extending bars 18 welded to the rings 16 at 19 and to the cylindrical housing 13 at 20. The rotatable member of the machine includes a shaft 21 having a rotor 22 thereon provided with salient poles 23 to which fan blades 24 are secured. The cooling gas, such as hydrogen, is circulated through the machine by the fan blades 24 which are arranged at an angle to the axis of the machine and which are provided with peripherally extending shrouds 25 so that they draw gas along the axis of the rotatable member which is discharged radially outward through the ducts 12 in the core structure to effectively cool the machine. The gas passes through the ducts and into the space between the core structure 10 and the housing 13 and thence axially of the machine and into the end of the rotatable member as indicated by the arrows in Fig. 1, it being understood that the cooling gas may be circulated at both ends of the machine in the same manner.

In order to cool the gas as it passes out of the core structure of the stationary member, from which it abstracts a large amount of heat, arcuate pipes 26 are arranged in the section 27 of the housing 13 through which cooling water is circulated from connections 28. The flow of gas from the space surrounding the core structure to the end of the rotatable member is confined to the space immediately surrounding the tubes 26 by arcuate plates 29, 30 and 31, the latter abutting the stationary member. In order to direct the flow into the fan blades 24 in such manner as to obtain the most effective flow of air through the machine, an annular plate 32 is secured to the outer end of the arcuate plate 31 and is provided with deflector rings 33 which are secured to the inner periphery of the plate 32 so as to direct the gas into the end of the rotatable member. The foregoing described arrangement of arcuate coolers and baffles forms no part of my invention, but is the invention of Chester W. Rice, which is described and claimed in his application, Serial No. 456,699, filed May 28, 1930, the application being assigned to the assignee of my invention.

In accordance with my invention, I provide a removable gas-tight housing enclosing the current-collecting devices which is sealed from the housing of the machine in such manner as to prevent excessive leakage of the cooling gas from the housing along the shaft when the casing is removed for inspection or adjustment of the current-collecting devices, and the circulation of cooling gas from the housing through the gas-tight casing is provided by connections which can be closed to prevent the leakage of cooling gas from the housing when the gas-tight casing is opened. In this manner the current-collecting devices are made readily accessible without the necessity of employing a liquid seal between the shaft and the housing of the machine which would be required if the current-collecting devices were not enclosed in the gas-tight casing.

In the particular construction illustrated, I make the current-collecting devices readily accessible by extending a portion 34 of the shaft 21 from the bearing 35 of the rotatable member through an opening 36 and attach slip rings thereto, each of which is connected to that portion of the shaft adjacent the opening by a supporting ring from which they are insulated. The slip rings are connected to the windings of the rotatable member of the machine by studs 39 and radially extending flat bars 40 which are mechanically connected together on the axis of the machine by bolts 41 and entirely insulated from each other electrically at 42. Conductors 43 extend from the bars 40 through the shaft 21 complete the circuit between the slip rings and the windings of the rotatable member. The bars 40 turn with the slip rings during operation of the machine and serve as impeller blades for circulating the cooling gas over the current-collecting devices. The slip rings are connected to an external circuit by brushes 44 which are supported on studs 45 and connected to conductors 46. The current-collecting devices are enclosed in a gas-tight casing 47 which is secured to the end-head 14 of the housing by bolts 48 and having a removable cover 49 bolted thereto at 50. When the cover 49 of the gas-tight casing is removed the leakage of gas from the housing along the portion 34 of the shaft of the rotatable member is substantially prevented by forming a shoulder 51 on the shaft which is engaged by an annular carbon seal 52 supported in a channel-shaped ring 53. The ring 53 is connected to the end-head 14 about the opening 36 by a radially corrugated bellows 54 which is secured to the ring 53 at 55 and to the end-head by bolts 56. This radially corrugated bellows is made of copper or other suitable metal having sufficient resiliency to maintain the carbon seal 52 in contact with the shoulder 51. By this construction when the machine is in operation the face of the carbon ring 52 bearing on the shoulder 51 becomes quite highly polished and thereby prevents any substantial leakage of gas from the housing when the cover 48 of the gas-tight casing is removed.

In order to obtain sufficient flow of gas from the housing through the casing 47 to cool the current-collecting devices, I provide a connection extending from the high pressure portion of the housing of the machine to the casing, and another connection extending from the casing to the low pressure portion of the housing. These connections are provided with valves to close off communication between the housing and the casing and prevent the loss of gas from the housing when the casing is opened. In this way I utilize the pressure difference created in these portions of the housing of the machine for obtaining the circulation of gas from the housing through the casing for cooling the current-collecting devices. In the construction illustrated, a connection 57 communicates with the high pressure zone in the housing 13 and communicates with the casing 47 at 58 through pipe 59 and valve 60 so that the valve can be closed and the portion of the pipe 59 between the valve and the housing can be taken off when it is desired to remove the cover 49. As the connection 58 is on the axis of the machine the gas flowing from the high pressure zone in the housing flows into the bars 40 which serve as impellers and further facilitate the flow of gas through the casing from the housing. The connection 61 communicates with the low pressure zone in the housing 13 and with the casing 47 through a valve 62 and connection 63. When the valves 60 and 62 are closed the cover can be removed from the casing 47 without removing the gas from the housing. By this arrangement the pressure difference between the portions of the casing is also utilized to facilitate the circulation of cooling gas over the current-collecting devices.

In view of the foregoing it will be seen that I have disclosed a simple arrangement which provides ready access to the current-collecting devices or other auxiliary apparatus associated with the machine which it is desired to enclose without necessitating the removal of the cooling gas from the enclosed machine.

Although I have described a particular embodiment of my invention in which the current-collecting devices of a dynamo-electric machine are rendered readily accessible, it is apparent that the other auxiliary devices associated with the machine may be enclosed in a similar manner to provide ready access thereto without removing the gas from the enclosed machine. I do not desire to be limited to the particular arrangement set forth, and I intend in the appended claims to cover all modifications which do not depart from the spirit and scope of my invention.

What I claim as new and desire to secure by Letters Patent of the United States, is:

1. A dynamo-electric machine having stationary and rotatable members, a gas-filled housing enclosing said members, a current-collecting device associated with said rotatable member, a gas-tight casing enclosing said current collecting device and communicating with said housing, and means for closing off communication between said housing and said casing to provide access to said current-collecting device without removing the gas from said housing.

2. A dynamo-electric machine having stationary and rotatable members, a gas-filled housing enclosing said members, a current-collecting device associated with said rotatable member, a gas-tight casing enclosing said current-collecting device and communicating with said housing, means for circulating gas from said housing through said casing, and means for closing off communication between said housing and said casing to provide access to said current-collecting device without removing the gas from said housing.

3. A dynamo-electric machine having stationary and rotatable members, a gas-filled housing enclosing said members, a current-collecting device associated with said rotatable member, a gas-tight casing enclosing said current-collecting device and communicating with said housing, means carried by said rotatable member and arranged in said casing for circulating gas from said housing through said casing.

4. A dynamo-electric machine having stationary and rotatable members, a gas-filled housing enclosing said members, a current-collecting device associated with said rotatable member, a gas-tight casing enclosing said current-collecting device and communicating with said housing, means including a connection on said current-collecting device for circulating gas from said housing through said casing.

5. A dynamo-electric machine having stationary and rotatable members, a gas-filled housing enclosing said members, said rotatable member having a shaft extending through said housing, a current-collecting device associated with said shaft and arranged outside of said housing, a gas-tight casing enclosing said current-collecting device and communicating with the interior of said housing, and means for closing off communication between said housing and said casing to provide access to said current-collecting device without removing the gas from said housing.

6. A dynamo-electric machine having stationary and rotatable members, a gas-filled housing enclosing said members, said rotatable member having a shaft extending through said housing, a current-collecting device associated with said shaft and arranged outside of said housing, a gas-tight casing surrounding said current-collecting device and communicating with said housing, means for preventing the flow of gas along said shaft from said housing to said casing, and means for closing off communication between said housing and said casing to provide access to said current-collecting device without removing the gas from said housing.

7. A dynamo-electric machine having stationary and rotatable members, a gas-filled housing enclosing said members, said rotatable member having a shaft extending through said housing, a current-collecting device associated with said shaft and arranged outside of said housing, a gas-tight casing surrounding said current-collecting device and communicating with said housing, a shoulder on said shaft, means including a carbon ring engaging said shoulder for preventing the flow of gas along the shaft from said housing, a current-collecting device associated with said shaft and arranged outside of said housing, a gas-tight casing surrounding said current-collecting device and communicating with said housing, and means for closing off communication between said housing and said casing to provide access to said current-collecting device without removing the gas from said housing.

8. A dynamo-electric machine having stationary and rotatable members, a gas-filled housing enclosing said members, a current-collecting device associated with said rotatable member, a casing removably attached to said housing and enclosing said current-collecting device, said casing communicating with said housing, and means for closing off communication between said housing and said casing to provide access to said current-collecting device without removing the gas from said housing.

9. A dynamo-electric machine having stationary and rotatable members, a gas-filled housing enclosing said members, said rotatable member having a shaft extending through said housing, a current-collecting device associated with said shaft and arranged outside of said housing, a casing secured to said housing and cooperating therewith for enclosing said current-collecting device, means for preventing the flow of gas along said shaft from said housing to said casing, said casing communicating with said housing, and means for closing off communication between said housing and said casing to provide access to said current-collecting device without removing the gas from said housing.

10. A dynamo-electric machine having stationary and rotatable members, a gas-filled housing enclosing said members, means for creating a pressure difference between one part of the housing and another part thereof to circulate the gas therein, a current-collecting device associated with said rotatable member, a casing enclosing said current-collecting device, and means affording communication between said casing and the low and high pressure parts of said housing for circulating gas therefrom through said casing.

11. A dynamo-electric machine having stationary and rotatable members, a gas-filled housing enclosing said members, means for creating a pressure difference between one part of the housing and another part thereof to circulate the gas therein, said rotatable member having a shaft extending through said housing, means for preventing the flow of gas from said housing along said shaft, a current-collecting device associated with the portion of said shaft extending outside of said housing, a casing enclosing said current-collecting device, and means affording communication between said casing and the low and high pressure parts of said housing for circulating gas therefrom through said casing.

12. A dynamo-electric machine having stationary and rotatable members, a gas-filled housing enclosing said members, means for creating a pressure difference between one part of the housing and another part thereof to circulate the gas therein, said rotatable member having a shaft extending through said housing, means for preventing the flow of gas from said housing along said shaft, a current-collecting device associated with the portion of said shaft extending outside of said housing, a casing secured to the wall of said housing and enclosing said current-collecting device, and means affording communication between said casing and the low and high pressure parts of said housing for circulating gas therefrom through said casing.

13. A dynamo-electric machine having stationary and rotatable members, a gas-filled housing enclosing said members, said rotatable member having a shaft extending through said housing, an auxiliary device associated with said shaft and arranged outside of said housing, a gas-tight casing surrounding said device and communicating with said housing, means for preventing the flow of gas along said shaft from said housing to said casing, and means for closing off communication between said housing and said casing to provide access to said device without removing the gas from said housing.

14. A dynamo-electric machine having stationary and rotatable members, a gas-filled housing enclosing said members, means for creating a pressure difference between one part of said housing and another part thereof to circulate the gas therein, an auxiliary device associated with said rotatable member, a casing enclosing said device, means affording communication between said casing and the low and high pressure parts of said housing for circulating gas therefrom through said casing.

15. A dynamo-electric machine having stationary and rotatable members, a gas-filled housing enclosing said members, means for creating a pressure difference between one part of said housing and another part thereof to circulate the gas therein, said rotatable member having a shaft extending through said housing, means for preventing the flow of gas from said housing along said shaft, an auxiliary device associated with the portion of said shaft extending outside of said housing, a casing extending to the wall of said housing and enclosing said device, means affording communication between said casing and the low and high pressure side of said housing for circulating gas therefrom through said casing.

In witness whereof I have hereunto set my hand this 27th day of May, 1930.

EARLE S. HENNINGSEN.